United States Patent [19]

Wiacek et al.

[11] Patent Number: 4,670,362
[45] Date of Patent: Jun. 2, 1987

[54] SNAP-IN SEALING AND INSULATING MEMBER FOR GALVANIC CELLS

[75] Inventors: Marian Wiacek, Mississauga; Ronald J. Book, Toronto, both of Canada

[73] Assignee: Duracell Inc., Bethel, Conn.

[21] Appl. No.: 688,262

[22] Filed: Dec. 31, 1984

Related U.S. Application Data

[63] Continuation of Ser. No. 503,439, Jun. 13, 1983, abandoned.

[30] Foreign Application Priority Data

Jun. 16, 1982 [CA] Canada .................................. 405244

[51] Int. Cl.⁴ .......................................... H01M 2/08
[52] U.S. Cl. .................... 429/174; 429/163; 429/164; 429/172; 429/183
[58] Field of Search ............... 429/174, 163, 164, 172, 429/183

[56] References Cited

U.S. PATENT DOCUMENTS

| | | | |
|---|---|---|---|
| 4,020,241 | 4/1977 | Heinz, Jr. | 429/172 |
| 4,079,172 | 3/1978 | Potts et al. | 429/172 |
| 4,112,200 | 9/1978 | Heinz, Jr. | 429/172 |
| 4,146,681 | 3/1979 | Spanur | 429/172 |
| 4,220,694 | 9/1980 | Uetani et al. | 429/172 |
| 4,237,203 | 12/1980 | Tsuchida et al. | 429/56 |
| 4,309,493 | 1/1982 | Kuhl et al. | 429/174 |

Primary Examiner—Arthur P. Demers
Attorney, Agent, or Firm—Ronald S. Cornell; James B. McVeigh

[57] ABSTRACT

A sealing and insulating member for a cell formed with an inwardly directed shoulder in the periphery of the member. A downwardly and outwardly extending skirt extends below the shoulder, the maximum diameter of which is located at its lowest extremity with that diameter being greater than the diameter at the bead of a cell can. The sealing and insulating member can be snap-fitted into the can prior to crimping, and held in place without the necessity to pre-crimp.

10 Claims, 4 Drawing Figures

SNAP-IN SEALING AND INSULATING MEMBER FOR GALVANIC CELLS

This application is a continuation of application Ser. No. 503,439 filed June 13, 1983 now abandoned.

This invention relates to sealed galvanic cells, such as primary alkaline cells, and particularly relates to a seal member for such cells. Seals made according to this invention are particularly designed to have a snap-in fit to the cell container.

The general construction of sealed, cylindrical galvanic cells is such that the principal components, an anode and a cathode, are assembled into a can, together with the appropriate separators, electrolyte, etc., and the cell is closed by a member placed in the top end of the can. Such member seals the cell so as to preclude electrolyte leakage therefrom, and electrically insulates the anode contact of the cell from the can. It is also desired that a sealed cell should be provided with a vent so that if extreme pressures develop within the cell, the vent will open to permit a controlled release of gas. Such vent can be provided as a membrane in the seal.

A co-pending U.S. patent application Ser. No. 446,115 filed Dec. 2, 1982, now U.S. Pat. No. 4476200, describes a seal for galvanic cells which is formed of polypropylene and co-polymers thereof, contrary to the usual expectations that would be drawn from the prior art that nylon, polyvinyl chloride or ABS—which are recognized as "engineering plastics"—should be used.

One desirable embodiment of the present invention contemplates the use of polypropylene and co-polymers thereof. These materials have properties which permit the provision of rupturable membranes formed in the seal during the moulding operation of the members. Another property of these polymers is that they can be stressed in some areas of a moulded member in a manner that they can be formed with a downwardly and outwardly extending skirt in their lower portion so that they may be snap fitted over a bead in the cathode can. This assures that the sealing and insulating member is positioned in the correct place within the can prior to crimping. Moreover, by locating the seal in accordance with the present invention, by snap fitting it into the mouth of the can, more uniform manufacturing results are obtained. Still further, a greater internal volume of the can may be provided, whereby additional active material may be placed in the can so as to thereby improve the energy capacity of the cell.

Because the thermal co-efficient of expansion of polypropylene and co-polymers thereof is quite different from that of steel, unlike that of nylon which is much closer to that of steel, provision must be made that the sealing and insulating members maintain their sealing integrity during severe temperature cycling, storage at very high or very low temperatures, deep discharge, or combinations of those severe operating and/or storage conditions for the cell. Thus, after the seal is snap-fitted into the cell and has been secured in the cell by crimping, the present invention contemplates the desirable provision of a portion of the seal below the crimp and/or against the bead which has been stressed beyond the elastic limit of the material, and another portion of the seal, generally at the periphery thereof between the bead and the crimp, which is not stressed beyond the elastic limit thereof. At the same time, so as to preclude an inward migration of the central portion of the seal during the crimping operation, we have discovered that the seal will desirably be designed so that when it is snap-fitted into the can the central portion of the member will have a slight change of elevation upwardly with respect to the periphery thereof and the bottom of the can.

All of these features, and others, are accomplished by the provision of a cylindrical sealed galvanic cell (such as for alkaline cells or lithium/manganese dioxide cells, etc.) having, in combination, an anode and a cathode placed in a generally cylindrical can which has a closed bottom end and an opened top end, and an inwardly extending bead is formed near the top end of the can, and into which is also placed a sealing and insulating member at the top end of the can. This seal is held in sealing relationship to the can, after final assembly, by a crimp which is formed by forcing the top edge of the can over the top periphery of the member. The upper portion of the seal is made to have a diameter which is substantially the same as the inside diameter of the can in the region above the bead. An inwardly directed shoulder is formed in the periphery of the member, below the upper portion, to a diameter which is substantially the same as, or slightly less than, the diameter of the can at the bead. The shoulder is subtended by a downwardly and outwardly extending skirt which is formed in the lower portion of the seal where the maximum diameter of the skirt portion is located substantially at the lowest extremity thereof, and is greater than the diameter of the can at the bead. The seal is snap-fitted into the can with the upper portion above the bead and the lower skirt portion below the bead, after which the crimping action takes place.

One of the advantages of the present invention is that after the seal has been snap-fitted into the cathode can, there is reasonable assurance that there will be no spillage or evaporation of the components of the cell, while the cell waits for the final crimping operation to take place.

The snap-in feature, in addition to keeping the seal from floating up, also locates the seal accurately with respect to the top of the can for the crimping operation. That is, the sealing and insulating member does not float or ride up in the can before crimping or during the crimping operation, as it might otherwise do.

There is thus provided a galvanic cell and a sealing and insulating member therefor which may have a variety of precise configurations, depending upon the size and type of cell being sealed, where all of the desired characteristics described above, and others, may be accomplished.

These, and other features and objects of the invention are, however, more fully described hereafter in association with the accompanying drawings, in which.

Figure 1:
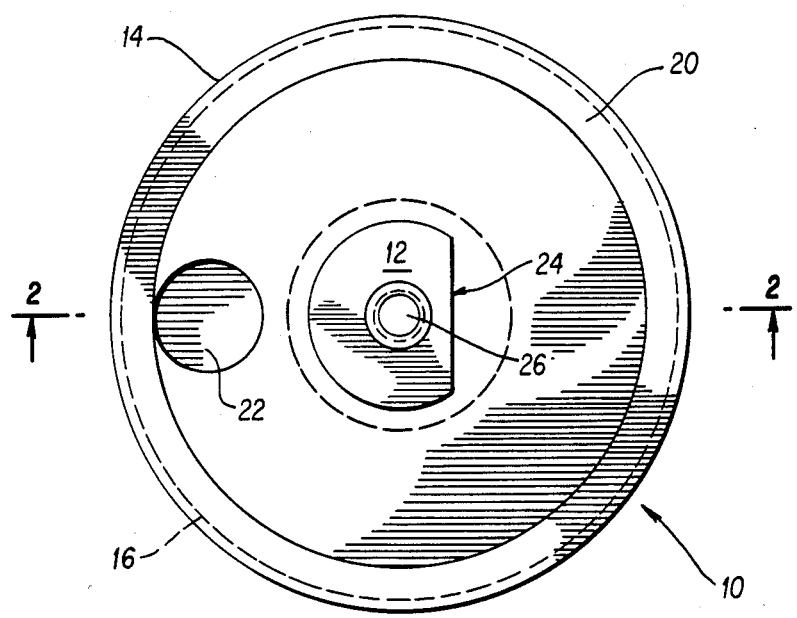
FIG. 1 is a plan view of a typical seal according to the present invention.
Figure 2:
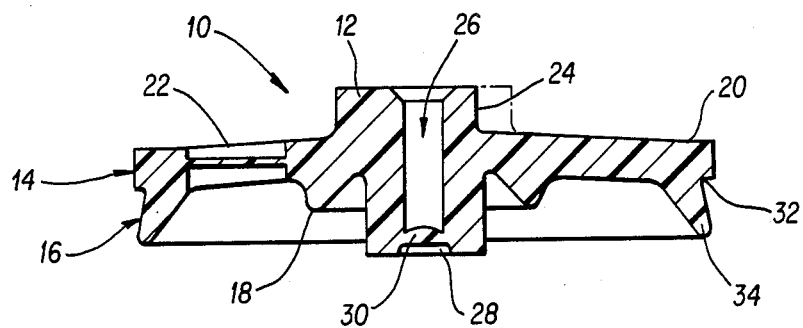
FIG. 2 is a cross-sectional view of the member of FIG. 1, in the direction of arrows 2—2.

Referring now to FIGS. 1 and 2, there is shown a typical sealing and insulating member according to the present invention of a type which could be utilized for sealed alkaline cells of the "D" size.

The sealing and insulating member 10, shown in FIGS. 1 and 2, has a central portion 12, a peripheral upper portion 14 and lower portion 16. On the underside of member 10, there is formed a circular rib 18, concentric with the periphery.

The outer portion of the upper surface of the member 10, at 20, is conveniently formed so that it is relatively flat, so as to accommodate the crimp which will later be made in the can into which the member is fitted; and at a position inwardly of the outer section 20, there is formed a thin vent membrane 22.

For purposes of orientation of the member 10, if required, central portion 12 may be flattened, as at 24. There is also formed, in the central portion 12, downwardly and upwardly extending cavities 26 and 28, with a plug portion 30 therebetween, discussed below.

Of particular interest in the embodiment of the seal shown in FIGS. 1 and 2, is the inwardly directed shoulder 32 formed in the outer periphery below the upper portion 14; and it is noted that the shoulder 32 is subtended by a downwardly and outwardly extending skirt 34 which is formed in the lower portion 16 of the member 10. The diameter of the upper portion 14 of the member 10 is substantially the same as the inside diameter of the cathode can above the preformed inwardly extending bead near the top end of the can. Likewise, shoulder 32 extends inwardly to a diameter which is substantially the same or slightly less than the diameter of the cathode can, at the bead. Skirt 34 of member 10 has its maximum diameter (which is greater than the diameter of the cathode can at the bead) located substantially at its lowest extremity. The lowest portion of the skirt may be chamfered to permit ease of insertion past the bead. The cross-section of the skirt portion 34 decreases in thickness below the shoulder 32, towards the lowest extremity of the skirt.

Figure 3:
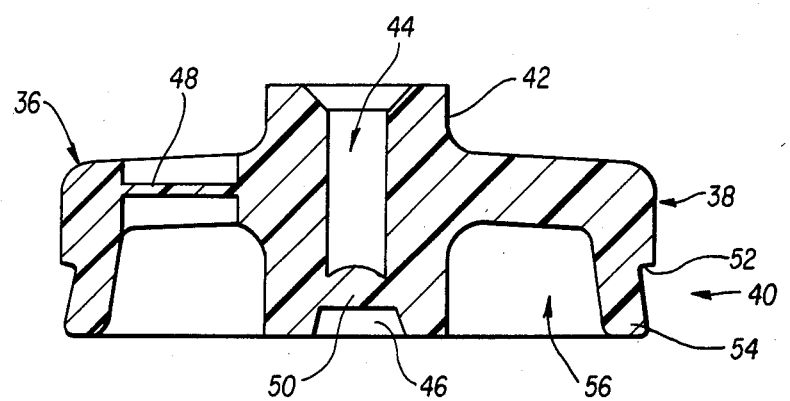
FIG. 3 is a cross-section of another typical sealing and insulating member according to the present invention.
Figure 4:
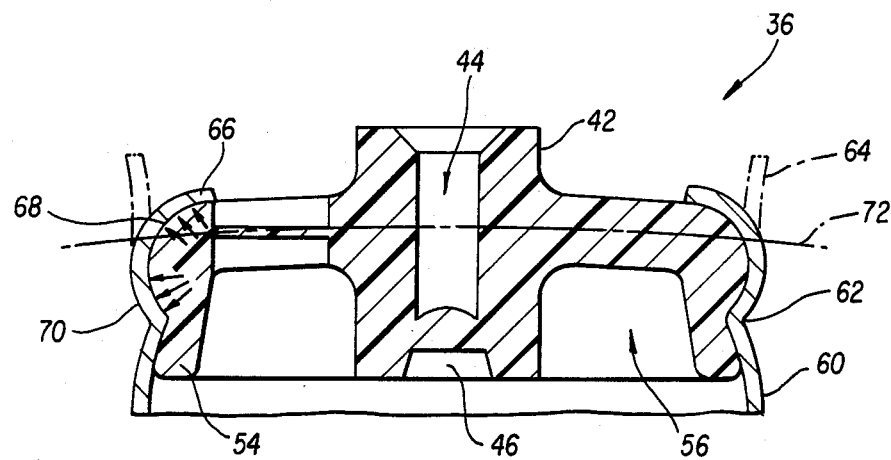
FIG. 4 is a cross-section of the same member after it has been sealed by crimping the top of a galvanic cell can.

FIGS. 3 and 4 show another typical embodiment of a seal according to the present invention and suitable for sealed alkaline cells of the "AA" size. Seal 36 has an upper portion 38, a lower portion 40, and a central portion 42 having downwardly and upwardly extending recesses 44 and 46 with a plug portion 50 therebetween. A thin membrane portion 48 can be provided for vent purposes.

In the outer periphery of seal 36, below the upper portion 38, a shoulder 52 is provided below which is a downwardly and outwardly extending skirt portion 54. The cross-section of the skirt portion 54 is substantially constant below the shoulder 52. It will also be noted that, on the underside of the member 36, there is a circular recess 56, discussed hereafter.

FIG. 4 demonstrates the effect of the crimping action of a can with respect to seals made according to the present invention. In FIG. 4 only the upper portion of can 60 is shown. Near the top of can 60 is formed a bead 62. The diameter of the can 60 above and below crimp 62 are generally the same. However, prior to crimping, the extreme upper portion of the can may be slightly flared outwardly, as indicated at 64, and after the crimp is formed, as at 66, a portion of the top of the seal is covered.

It will be clear from FIG. 4 that prior to crimping, the installation of the seal 36 into the can 60 is such that the member is forced downwardly, causing the skirt portion 54 to flex inwardly as the lower extremity thereof passes bead 62, after which the skirt portion 54 substantially regains its original configuration because it has been stressed to an extent which is well below the elastic limit of the material of wich the member is formed. However, the limit to which member 36 is permitted to intrude downwardly into the can 60 is determined by seating of the shoulder 52 on bead 62. Thus, a relatively secure placement of the seal in the can is assured, by exerting sufficient force against the sealing and insulating member until it "snaps" into the can in a specific relationship to the bead of the can.

The downwardly and outwardly extending skirt portion of the seal of this invention provides the inverted-U configuration with an upwardly extending cavity on the underside of the member, whereby an overall thinner cross-section of the member in its upper portion may be used. This results in a greater internal volume within the cell with no loss of structural strength of the sealing and insulating member; and may also result in the use of a smaller quantity of plastic for the production of the member.

For example, having regard to seal 36 shown in FIGS. 3 and 4, it is evident that the separator within the cathode can, to which it will be fitted, may extend upwardly into the cavity 56 on the underside of the member. Likewise, a separator in a cell into which a member 10, as shown in FIGS. 1 and 2, may be fitted, may extend upwardly to the underside of the member outwardly of the circular rib 18. Moreover, because it is known by virtue of the interference of the shoulder 32 or 52 with the bead 62 (or otherwise) how far the sealing and insulating member will intrude into the can prior to crimping, placement of more material in the can is possible.

The effect of crimping is shown in FIG. 4, where stress distribution within the material of the upper portion 38 of the member 36, at the outer periphery thereof, is indicated by the groups of arrows shown at 68 and 70. The crimping force which is required to create the crimp at 66 causes portions of the outer peripheral area of the upper portion 38 to be stressed to varying amounts, whereby the distributed forces set up a stress gradient which is such that at least a first portion of the peripheral portion is stressed to an extent greater than the elastic limit of the material from which the sealing and insulating member has been formed. At other portions, the amount of stress is less than the elastic limit.

Generally, the highly stressed portions occur at the upper corner beneath the crimp, and may also occur at the lower corner, above the shoulder 52, above the bead 62 of the can 60.

Likewise, there may be some flexing of the material of the sealing and insulating member, other than the material of the downwardly and outwardly depending skirt portion in the lower portion of the member, such that a change of elevation may occur. Because of the general configuration of the sealing and insulating member, of any of the figures shown, the change of elevation of the central portion of the member is upwards with respect to the bottom of the can, as shown by the dashed line 72 in FIG. 4.

In any event, the crimping force by which the crimp is formed in the top of the can is such that the upper portions of the can near the top edge thereof are cold worked, so that upon release of the crimping forces by removal of the can from the crimping die, the crimp remains and thus the stress distribution within the material of the sealing and insulating member, discussed above, also remains.

These crimping and stress distribution characteristics are important when it is realized that, not only does the sealing and insulating member act to seal the can after crimping, it must continue to seal the can when the cell is subjected to extreme temperature variations and/or charging or discharging characteristics. By proper dimensioning and proportioning of the seal it is possible that it will remain secure at all temperatures. For example, if the cell is subjected to extremely cold temperatures, the sealing and insulating member may shrink to a greater extent than the can, but a seal is assured because of the characteristics referred to above. Likewise, if the cell is subjected to extremely high temperatures, the seal is again assured, although at a different portion of the periphery of the sealing and insulating member.

When the material to be used for production of the seal according to the present invention is a homo- or co-polymer of polypropylene, it has been found that the best results are obtained when the melt index of the polypropylene is between 4 and 30, preferably between 9 and 14.

The melt index or melt flow index is an indication of the average molecular weight and melt viscosity of a plastic. Resins which have low melt flow indexes provide greater toughness, whereas resins which have higher melt flow indexes have a better mould fill out, with possibly shorter mould cycles and a higher gloss on the moulded product.

In any event, it is to be noted that homo-polymers and co-polymers of polypropylene are very practical for moulding seals with a thin membrane (e.g., 22 or 48). There is no necessity to provide fracture lines or specifically designed cross-sections, but pressure relief venting is assured. Moreover, very close tolerance as to the thickness of the membrane may be designed for and assured.

As previously mentioned, the downwardly extending recesses 26 or 44 are terminated at their bottom by a plug 30 or 50 respectively. The plug is formed with its thinnest part in its cross-section around its periphery. Moreover, the underside of the plug portion terminates at an upwardly extending recess 28 or 46, which is greater in diameter than the diameter of the downwardly extending recess. Thus, when a current collector is inserted through recess 26 or 44, a clean fracture of the plug portion is assured because there is an induced fracture line or stress concentrater line, from the extreme outer edge of the upper surface of the plug portion 30 or 50, to the sides of the upwardly extending recess below the plug portion.

The configuration of the seal of the present invention may have differing specific features. For example, as noted in FIG. 2, the central portion of the member may extend below the skirt portion; whereas, as noted in FIG. 3, it may extend downwardly to substantially the same extent as the skirt portion. Likewise, the upper surface or at least a portion of the upper surface of the member may be sloped downwardly and outwardly from the centrally disposed portion, such as is shown in FIG. 3 or the central portion of FIG. 2 inwardly from the outer upper peripheral portion 20.

Materials that have been contemplated, and of which sealing and insulating members according to the present invention have been moulded, include the following filled or unfilled resins: polypropylene, polyethylene, co-polymers of polypropylene with polyethylene, polysulfone, and mixed polymers of acrylonitrile, butadiene, and styrene. However, polypropylene and co-polymers of polypropylene with polyethylene, where the melt index of the polypropylene is between 4 and 30, and preferably between 9 and 14, have yielded particularly acceptable results.

The snap-in feature of sealing and insulating members according to the present invention assures that the top may be pre-assembled to cells into which the active material has been loaded, without the need of precrimping, and with the assurance that the sealing and insulating member will not float up in the cell during the crimping operation. Thus, during the crimping operation on cells having elements according to this invention, downward pressure against the element may be reduced or eliminated, without any loss of electrolyte from the cell due to the crimping pressure.

Because proper dimensioning of the seal member assures that stress distribution in the peripheral material of the member will occur, so that there will be a portion that has been stressed above the elastic limit and a portion that has not been stressed beyond the elastic limit of the material, integrity of the cell against electrolyte leakage, during and following temperature cycling and deep discharge, is assured. Moreover, controlled venting rather than uncontrolled rupture, such as in reverse polarity or charging conditions of the cell, is also assured.

Other embodiments than those referred specifically above, and other materials than those mentioned, may of course be used, and other sealed galvanic systems other than those referred to, may utilize the present invention, without departing from the spirit and scope of the appended claims.

What is claimed is:

1. In combination, a sealed galvanic cell, having an anode, a cathode, and a generally cylindrical can, said can having a closed bottom end and an open top end, and said can having a performed inwardly extending bead near the top end thereof; and further comprising:

a seal member at the top end of said can, said seal member being held in sealing relationship to said can by a crimp formed at the top edge of said can, with said top edge of the can extending over the top periphery of said member;

where said seal member is formed with an upper portion, a centrally disposed portion, having a thickness greater than the surrounding material, through which a current collector is inserted, and an inwardly directed shoulder in its periphery extending to a diameter which is slighty less than the diameter of said can at said preformed bead;

said shoulder being subtended by a downwardly and outwardly extending skirt formed in the lower portion of said member, where a portion of said skirt has a diameter greater than the diameter of said can at said preformed bead, with a circular recess formed on the underside of said seal member between said skirt portion and said centrally disposed portion whereby said skirt portion may be flexed inwardly past said preformed bead.

2. The combination of claim 1 where said skirt has a maximum diameter located substantially at its lowest extremity.

3. The combination of claim 1 where said skirt has a cross-section which decreases in thickness from said shoulder towards its lowest extremity.

4. The combination of claim 1 where said skirt has a substantially constant cross-section below said shoulder.

5. The combination of claim 1 wherein said seal member is so dimensioned and the force of crimping at the top edge of said can is sufficiently high that the central portion of said seal member is elevated with respect to the periphery thereof.

6. The combination of claim 1 wherein the crimping force causes at least a first portion of the thickness of the peripheral material of said upper portion of said seal member to be stressed to an amount greater than the elastic limit of the material thereof, and at least a second portion of the thickness of the peripheral material of said upper porton of said seal member is stressed to an amount less than the elastic limit of said material.

7. The combination of claim 1 where said seal member is formed with a centrally disposed portion, having a thickness greater than the surrounding material, which extends downwardly to substantially the same extent as said skirt portion.

8. The combination of claim 1 where the material of said seal member is such that it is sufficiently resilient to permit it to be snapped past the bead on said can.

9. The combination of claim 8 where the material of said seal member is selected from the group consisting of the filled or unfilled polypropylene, polyethylene, co-polymers, or polypropylene with polyethylene, polysulfone, and acrylonitrile-butadiene-styrene terpolymers.

10. The combination of claim 9 where the material of said seal member is selected from the group consisting of polypropylene and co-polymers of polypropylene with polyethylene, and the melt index of said material is between 9 and 14.

* * * * *